United States Patent [19]

Collot et al.

[11] Patent Number: 5,063,482

[45] Date of Patent: Nov. 5, 1991

[54] MOTOR VEHICLE HEADLIGHT INCLUDING AN INDICATOR DEVICE FOR INDICATING THE ELEVATION DIRECTION OF ITS REFLECTOR

[75] Inventors: Patrice Collot, Pantin; Jean-Marie Brel, Claye-Souilly; Guy Dehaene, Bagnolet, all of France

[73] Assignee: Valeo Vision, Bobigny Cedex, France

[21] Appl. No.: 657,510

[22] Filed: Feb. 19, 1991

[30] Foreign Application Priority Data

Feb. 20, 1990 [FR] France .................................. 90 02027
Jun. 25, 1990 [FR] France .................................. 90 07939

[51] Int. Cl.[5] .............................................. F21M 3/20
[52] U.S. Cl. ........................................ 362/66; 362/287; 33/370; 33/379
[58] Field of Search ............... 362/61, 66, 80, 277, 362/282, 287, 428, 427; 33/335, 365, 354, 370, 379

[56] References Cited

U.S. PATENT DOCUMENTS

| 1,609,634 | 12/1926 | Ryan | 33/370 |
| 2,058,743 | 10/1936 | Trippe | 362/311 |
| 4,794,495 | 12/1988 | McMahan | 362/66 |
| 4,802,067 | 1/1989 | Ryder et al. | 33/335 |
| 4,984,136 | 1/1991 | Yamagishi et al. | 362/66 |

FOREIGN PATENT DOCUMENTS 173502  7/1989  Japan .................................. 362/66

*Primary Examiner*—Stephen F. Husar
*Assistant Examiner*—Richard R. Cole

[57] ABSTRACT

A motor vehicle headlight comprising a light source, a reflector, a housing, and a front glass, and also comprising an indicator device for indicating the elevation direction of the reflector, the indicator device being of the type comprising a spirit level mounted on the reflector in a plane which is essentially vertical and parallel to the optical axis defined by the reflector, the spirit level being in a predetermined angular relationship with the optical axis. The spirit level is mounted on a hollow support having an end edge suitable for bearing against the rear face of the reflector around a lamp mounted in the reflector.

10 Claims, 2 Drawing Sheets

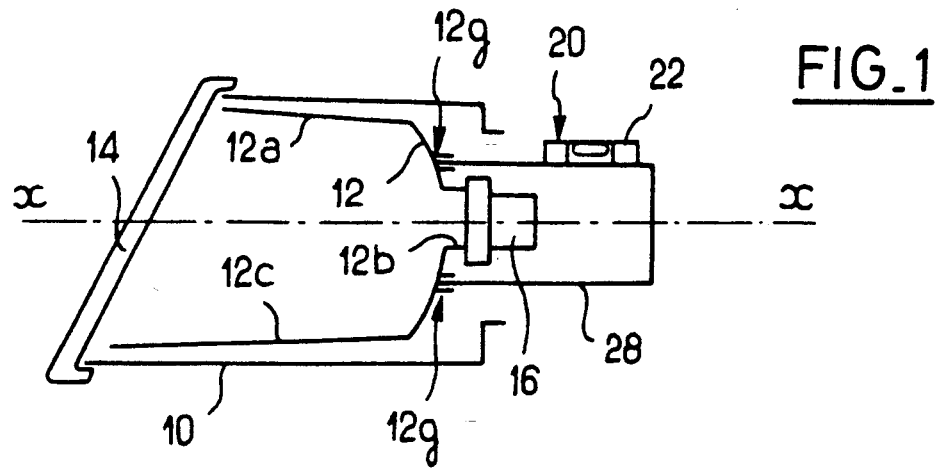
FIG_1
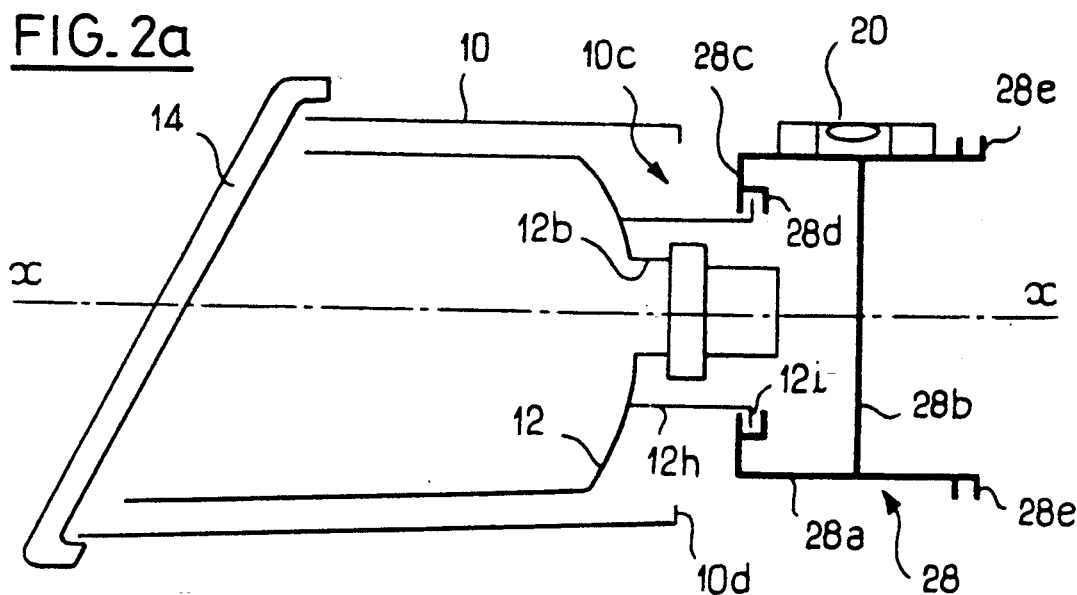
FIG_2a
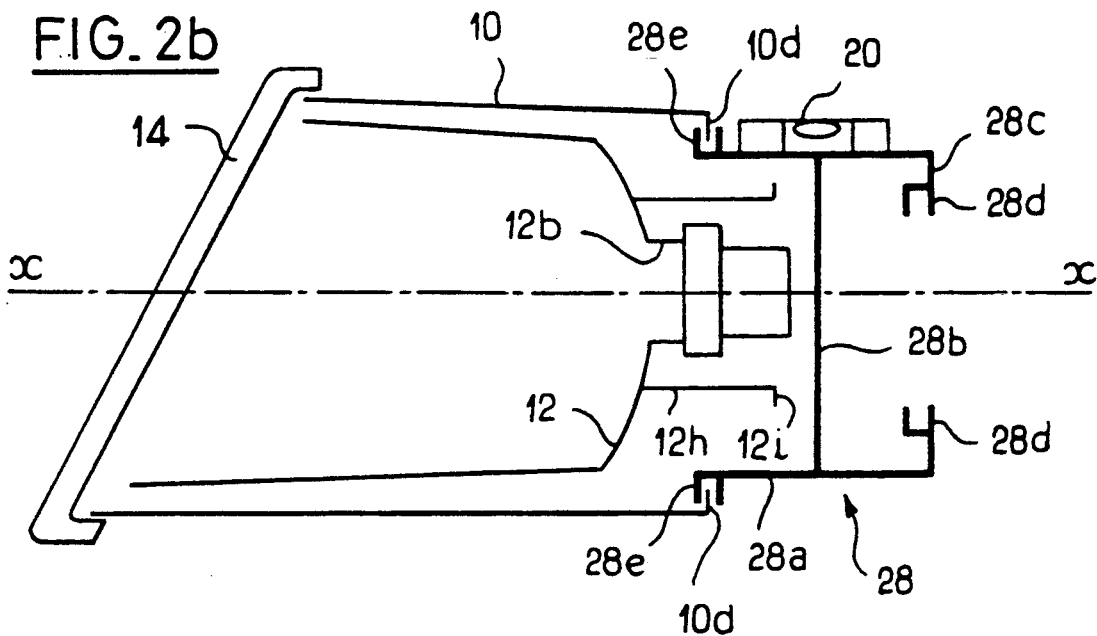
FIG_2b

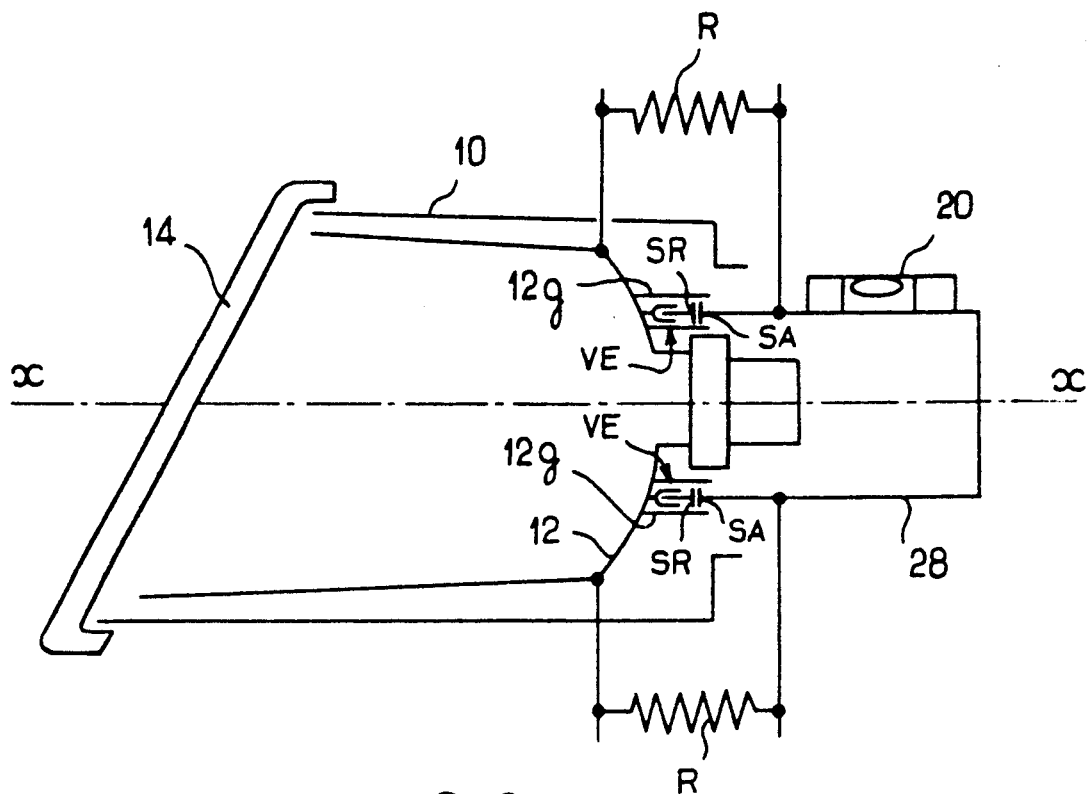
FIG_3
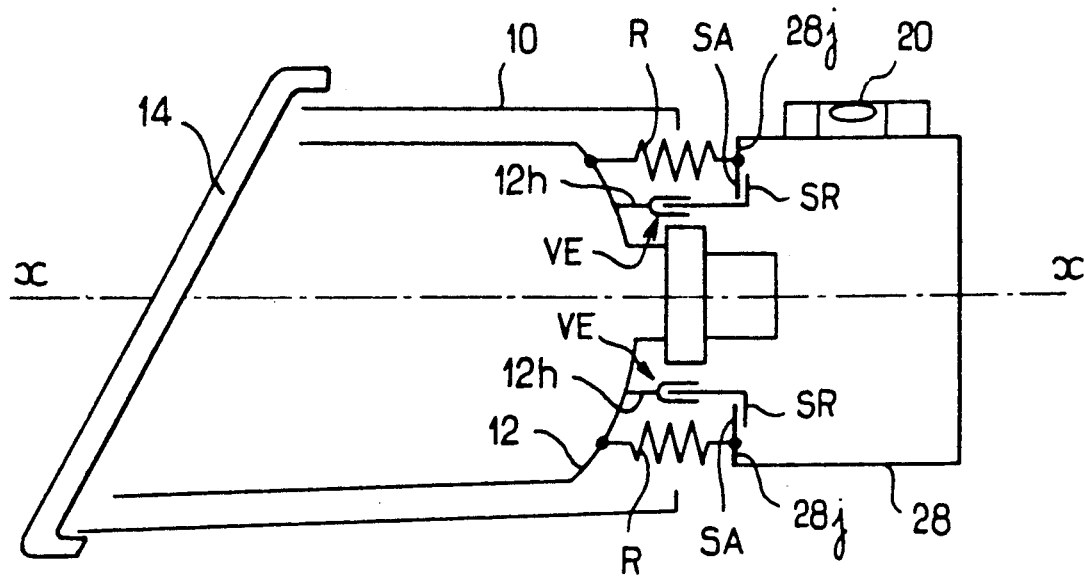
FIG_4

MOTOR VEHICLE HEADLIGHT INCLUDING AN INDICATOR DEVICE FOR INDICATING THE ELEVATION DIRECTION OF ITS REFLECTOR

The present invention relates in general to adjusting the direction in which motor vehicle headlights point.

It relates more particularly to a headlight including an indicator device for indicating the elevation direction of its reflector for the purpose of bringing the optical axis defined by said reflector into a given plane, e.g. the horizontal plane, while performing adjustment operations.

BACKGROUND OF THE INVENTION

Japanese patent application published under the number 1-173 502 discloses a headlight in which a spirit level is used to indicate the direction in which the reflector is pointing relative to the horizontal for the purpose of performing elevation adjustment on the beam. The spirit level is mounted on a body suitable for being removably installed behind the lamp base while the lamp is mounted in the reflector.

A drawback of this device lies in that the accuracy with which the direction is indicated relies on the accuracy with which the lamp is positioned in the lamp hole in the reflector. Thus, in the conventional case where fairly large clearance may exist between the reflector and the lamp, or where there may be poor positioning reproducibility from one lamp to another, in particular because of the manufacturing tolerances on lamp bases, the indication is given with insufficient accuracy.

The present invention seeks to minimize this inaccuracy by proposing a device in which the spirit level support is capable of bearing against the rear surface of the reflector.

SUMMARY OF THE INVENTION

In a first aspect, the present provides a motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to the optical axis defined by said reflector, the spirit level being in a predetermined angular relationship with said optical axis, wherein the spirit level is mounted on a hollow support having an end edge suitable for bearing against the rear face of the reflector around a lamp mounted in the reflector.

In a second aspect, the present invention provides a motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to an optical axis defined by said reflector, the spirit level being in a predetermined angular relationship with said optical axis, wherein the spirit level is mounted on a support suitable for bearing via a plurality of thrust surfaces against a set of associated reference surfaces fixed to the reflector, the device further including means for adjusting the position of at least one of said reference surfaces in a direction substantially parallel to the optical axis.

BRIEF DESCRIPTION OF THE DRAWINGS

Embodiments of the invention are described by way of example with reference to the acompanying drawings, in which:

FIG. 1 is a diagrammatic axial vertical section through a headlight fitted with an indicator device of the invention;

FIG. 2a is an axial vertical section view through a first variant of the headlight of the invention shown in a first state;

FIG. 2b is a view analogous to FIG. 2, showing the headlight in a second state;

FIG. 3 is an axial vertical section through a second variant headlight of the invention; and FIG. 4 is an axial vertical section through a third variant headlight of the invention.

It is specified that items or portions which are identical or similar from one figure to another are designated wherever possible by the same reference numerals.

MORE DETAILED DESCRIPTION

With reference initially to FIG. 1, a headlight comprises a housing 10, a reflector 12 situated inside the housing, and a glass 14 closing the front of the housing. A lamp (not shown) co-operated with the reflector to form a beam.

A spirit level 20 conventionally constituted by a transparent cylindrical tube 22 containing a liquid (not necessarily a spirit) and a bubble is mounted as explained in greater detail below on the reflector in such a manner that the axis of the tube 22 is in a well-defined angular relationship with an optical axis xx defined by said reflector. Specifically, the angular relationship may be accurate parallelism, but other relationships are also possible. A window 10a is also formed through the top wall of the housing to enable the spirit level to be observed from outside the housing.

Means are also provided of entirely conventional design not described herein for the purpose of displacing the reflector 12 by pivoting it about a horizontal line extending essentially transversely to its optical axis, thereby varying the elevation angle of said optical axis and of the generated beam.

When it is desired to adjust the reference position of the reflector so as to bring its optical axis into a determined plane (horizontal in the present example) the means for displacing the reflector are actuated while observing the spirit level 20 until the spirit level indicates that the desired horizontal direction has been obtained.

According to an essential aspect of the invention, the spirit level support also bears against the rear of the reflector. However, in this case, the lamp can be left in place and the support 28 for the spirit level 20 comprises a tube suitable for bearing against the rear face of the reflector 12 by surrounding the lamp-supporting collar 12b and the lamp 16 as shown in part. The spirit level 20 in this example is fixed on the top of the support 28, behind the reflector.

In order to ensure that the reference direction established by the spirit level is in the desired angular relationship relative to the optical axis xx, ribs or the like 12g may be provided on the rear surface of the reflector, thereby making it possible to position the support 28 accurately relative thereto.

In the embodiment of FIG. 1, the spirit level and its support constitute parts that are independent of the headlight and that are put into place temporarily each time an adjustment operation is required.

A variant embodiment is now described with reference to FIGS. 2a and 2b in which the spirit level constitutes an integral portion of the headlight so as to minimize the risk of loosing it.

The support for the spirit level 20 is referenced 28 and the spirit level is fixed in a well determined position on the outside face of said support.

According to an essential aspect of this improvement, the support 28 and the spirit level 20 are capable of taking up a first position in which the elevation angle of the axis xx can be read (FIG. 2a), and a reversed, second position in which the support 28 is used as a rear cover for the headlight housing 10, thereby isolating the inside space of said housing fromt the outside.

Thus, in the present example, the support 28 comprises a cylindrical outer wall 28a and a transverse intermediate partition 28b which extends substantially across the middle of the support perpendicularly to the axis of the cylindrical wall. An inwardly directed annular lip 28c is provided at a first end (to the left in FIG. 2a and to the right in FIG. 2b), and positioning means are disposed along the inside edge thereof as represented at 28d in the form of an inwardly directed groove.

Fixing means shown diagrammatically at 28e are disposed at the opposite end of the support 28 and in this example they are constituted by a groove facing radially outwards.

In addition, at its rear, the reflector 12 includes a second collar 12h surrounding the lamp holding collar 12b, e.g. concentric therewith. An outwardly projecting positioning flange 12i is disposed at the rear end of said second collar 12h and is shaped and sized so as to be essentially complementary to the positioning groove 28d.

Furthermore, the rear of the headlight housing 10 includes an opening 10c which is delimited by a fixing collar 10d suitable for co-operating with the fixing groove 28d in the support 28.

In the position shown in FIG. 2a, the support 28 is held by the complementary positioning means 12i and 28d in a position which is well determined relative to the reflector such that the spirit level 20 occupies a well determined direction relative to that of the optical axis xx. Under these conditions, the spirit level is capable of indicating whether or not said optical axis is pointing in the proper direction.

When the support 28 is turned round by hand to occupy the position shown in FIG.2b, its transverse partition 28b enables it to act as a cover for closing the rear of the housing 10. Where necessary, a suitable passage is provided through the support 28 for passsing the conductors that power the lamp.

Naturally, the complementary positioning means between the support 28 and the reflector could be quite different in form from those described and shown in FIGS. 2a and 2b. Similarly, the fixing means between the housing and the support 28 could be quite different in form from those described and shown (e.g. fixing could be by means of a screw or by snap-fastening). It would also be possible to provide keying means (not shown) suitable for ensuring that when the support is in the state shown in FIG. 2a, the spirit level 10 occupies a position which is properly situated in the vertical plane including the optical axis xx, or in any other desired position.

In the embodiments described above, the positioning of the thrust surface of the reflector relative to its optical axis may suffer from a degree of dispersion, and variant embodiments are described below with reference to FIGS. 3 and 4, enabling such manufacturing dispersion to be overcome.

With reference to FIG. 3, the reflector end of the support 28 includes three individual thrust surfaces of small size (only two of which are shown in the figure), which thrust surfaces are referenced SA and extend substantially perpendicularly to the optical axis xx. These three thrust surfaces have three reference surfaces SR associated therewith on the rear of the reflector. For positioning purposes, these reference surfaces may be located in grooves or cavities 12g integrally molded with the rear surface of the reflector.

According to an essential aspect, one or more of these reference surfaces is adjustable in position along a direction essentially parallel to the optical axis xx, e.g. by means of screw and nut means given an overall reference VE in FIG. 3.

As a result, any dispersion that may occur between the direction of the optical axis and the positions of the reference surfaces can be compensated by taking the appropriate action on the devices VE, thereby ensuring that the support 28 for the spirit level 20 is indeed correcly positioned relative to the optical axis. For example, such compensation may be performed immediately after the reflector has been molded by placing the reflector in an appropriate calibration device.

It is preferable to use a system of reference surfaces situated at the three vertices of a right angle triangle, with the surfaces situated at the two vertices that are not right angles being adjustable in position by screw and nut systems, or the like.

In a variant embodiment (not shown) instead of adjusting the reference surfaces by mechanical adjustment means, they may be adjusted by providing the reference surfaces on studs or the like integrally molded with the reflector and designed to project beyond the ideal positions for said surfaces. After molding, the reflector is placed in a suitable calibration device and the reference surfaces are machined to the desired positions so that they define a position for the spirit level support 28 such that the spirit level indicates accurately whether the optical axis is pointing in the proper direction.

As shown in FIG. 3, it is also possible to provide resilient means such as springs acting between the support 28 and the reflector (or indeed the headlight housing) and serving to take up any slack that may exist between the reference surfaces SR and the thrust surfaces SA on the support 28. In this example, three springs R (only two of which are shown) are associated with the three pairs of thrust and reference surfaces, the springs operating in traction and being fastened by any appropriate means both to the reflector and to the support 28 (the diagram of FIG. 3 is intended solely to illustrate the mechanical effect of the spring).

The variant embodiment of FIG. 4 differs from that of FIG. 3 in that the thrust surfaces of the support 28 are all directed towards the inside of the support while the reference surfaces SR of the reflector all face towards the front of the headlight. More precisely, the support 28 is provided in this case with an inwardly directed rim 28j carrying the thrust surfaces SA and an additional collar 12h on the reflector carries an outwardly directed rim carrying the reference surfaces SA.

In this case, the slack take-up springs R operate in compression between the rear surface of the reflector and each of the inwardly directed rims 28j.

Naturally, the teaching of the various embodiments described in the present application may be combined. In particular, the dual-function support 28 as described with reference to FIGS. 2a and 2b may advantageously be used in combination with the means for compensating manufacturing dispersion and/or the means for compensation slack as described with reference to FIGS. 3 and 4. Thus, in the embodiment of FIG. 3, the end of the support 28 opposite from its thrust surfaces may be fitted with fixing means capable of co-operating with complementary fixing means provided around the rear opening of the housing 10.

Naturally, the present invention is not limited in any way to the particular embodiments described and shown and the person skilled in the art will be able to make variations or modifications without going beyond the scope of the following claims.

We claim:

1. A motor vehicle headlight comprising a light source, a reflector having a lamp supporting collar and a rear face, a housing, and a front glass, and also comprising an indicator device for indicating the elevation direction of the reflector, the indicator device being of the type comprising a spirit level mounted on said reflector in a plane which is essentially vertical and parallel to the optical axis defined by said reflector, the spirit level being in a predetermined angular relationship with said optical axis, wherein the spirit level is mounted on a hollow support having an end edge which is mounted adjacent an indicator support collar means which abuts against the rear face of the reflector around a lamp mounted in the reflector and at a distance from said lamp supporting collar.

2. A headlight according to claim 1, in which the end edge of said hollow support is mounted within said indicator support collar means and bears directly against the rear face of the reflector.

3. A headlight according to claim 1, in which the support further includes means at another end which, when said support is reversed through 180°; serve to fix the support on a rear opening of the headlight housing in order to close said housing.

4. A headlight according to claim 3, in which the support includes a generally cylindrical outside wall and an inside transverse partition, said outside wall being suitable for bearing against the rear face of the reflector and carrying the fixing means.

5. A headlight according to claim 4, in which the spirit level is fixed on the top of the support.

6. A headlight according to claim 3, in which the spirit level is fixed on the top of the support.

7. A motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to an optical axis defined by said reflector, the spirit level being in a predetermined angular relationship with said optical axis, wherein the spirit level is mounted on a support suitable for bearing via a plurality of thrust surfaces against a set of associated reference surfaces fixed to the reflector, the device further including means for adjusting the position of at least one of said reference surfaces in a direction substantially parallel to the optical axis.

8. A headlight according to claim 7, wherein resilient means are also provided to take up any slack between the thrust surfaces and the reference surfaces.

9. A headlight according to claim 8, in which the position adjusting means comprise a screw and nut assembly.

10. A headlight according to claim 7, in which the position adjusting means comprise a screw and nut assembly.

* * * * *